United States Patent [19]

Smith, Jr.

[11] Patent Number: 4,798,986

[45] Date of Patent: Jan. 17, 1989

[54] ELECTRIC GENERATOR HAVING STATIONARY INDUCTION COILS

[76] Inventor: Berry E. Smith, Jr., Star Rte. 1, Box 3921, Tallahassee, Fla. 32304

[21] Appl. No.: 180,192

[22] Filed: Apr. 11, 1988

[51] Int. Cl.$^4$ ............................................. H02K 1/22
[52] U.S. Cl. ..................................... 310/268; 310/184
[58] Field of Search ............... 310/156, 180, 184, 194, 310/205, 206, 254, 268

[56] References Cited

U.S. PATENT DOCUMENTS

| | | | |
|---|---|---|---|
| 3,700,942 | 10/1972 | Alth | 310/164 |
| 4,297,604 | 10/1981 | Tawse | 310/168 |
| 4,358,693 | 11/1982 | Palmer et al. | 310/46 |
| 4,435,662 | 3/1984 | Tawse | 310/168 |
| 4,612,470 | 9/1986 | Smith, Jr. et al. | 310/273 |
| 4,719,380 | 1/1988 | Smith, Jr. et al. | 310/114 |

Primary Examiner—Patrick R. Salce
Assistant Examiner—Marc S. Hoff
Attorney, Agent, or Firm—Earl L. Tyner

[57] ABSTRACT

An electric generator having a plurality of circumferentially spaced stationary induction coils, a rotatable armature of permanent magnets on a disc, magnetically conductive core in each said coil extending outwardly from said coil and terminating closely adjacent to the faces of the magnets as the disc is rotated.

16 Claims, 3 Drawing Sheets

ELECTRIC GENERATOR HAVING STATIONARY INDUCTION COILS

BACKGROUND OF THE INVENTION

Electric generators are well known devices for generating electricity by turning an armature of a plurality of copper wires through the magnetic flux produced in the field coil by passing electricity through copper wire wrapped around cores of soft iron. The electricity generated in the armature is withdrawn by slip rings as A.C. current, or by a commutator as D.C. current. Very little time has been spent in the prior art on generators which induce the current in the field coil. Such a generator is described in U.S. Patents; to Smith and Sharron, U.S. Pat. Nos. 4,612,470 and 4,719,380, and in copending patent applications by Smith, Ser. No. 054,722 filed May 27, 1987, and Ser. No. 152,327 filed Feb. 4, 1988. These inventions describe monopole generators having a single stationary field coil, a rotatable armature of permanent magnets, and between the coil and the armature a cage of alternating strips of magnetically conductive material. These devices are operable and remarkably efficient, and the present invention relates to an improved design.

It is an object of this invention to provide an improved electric generator of the type which induces current in a stationary induction. It is another object of the invention to provide an improvement wherein a plurality of induction coils are employed to provide the capability of a polyphase generator. Still other objects will become apparent from the more detailed description which follows.

BRIEF SUMMARY OF THE INVENTION

This invention relates to an electric generator which includes a plurality of stationary induction coils, a rotatable armature, and an elongated magnetically conductive core in each said coil; said coil comprising a plurality of turns of electrically conductive wire in the shape of a tubular shape around and closely encasing said elongated magnetically conductive core extending lengthwise through the central axis of passageway along a central longitudinal axis; the armature rotatable shaft and said coil; said armature comprising a disc structure mounted on said shaft with an even number of permanent magnets mounted circumferentially in an arragement of alternating polarity with the axis of each magnet being parallel to said shaft the coils being positioned in a spaced circumferential arrangement with one end of each coil adjacent to said disc structure and said core extending outwardly of said end to be in close proximity to said magnets, said coils being spaced apart in such a way that at any instant all of said cores are adjacently facing said magnets of the same polarity.

In one specific embodiment on the invention the strip coils and cores are cylindrical in shape and positioned parallel to said shaft. In another embodiment the cores are L-shaped with said coil encasing one leg of the L and the other leg of the L extending outwardly of the coil and terminating in close proximity to said magnets. In a special embodiment employing three coils and cores, the output current of each coil is separate and not connected to any other coil, and the coils are positioned to produce a three-phase current.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 2:
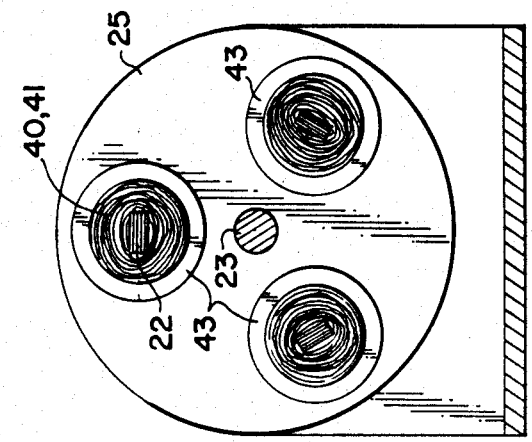
FIG. 2 is an end elevational view of the generator of FIG. 1.
Figure 1:
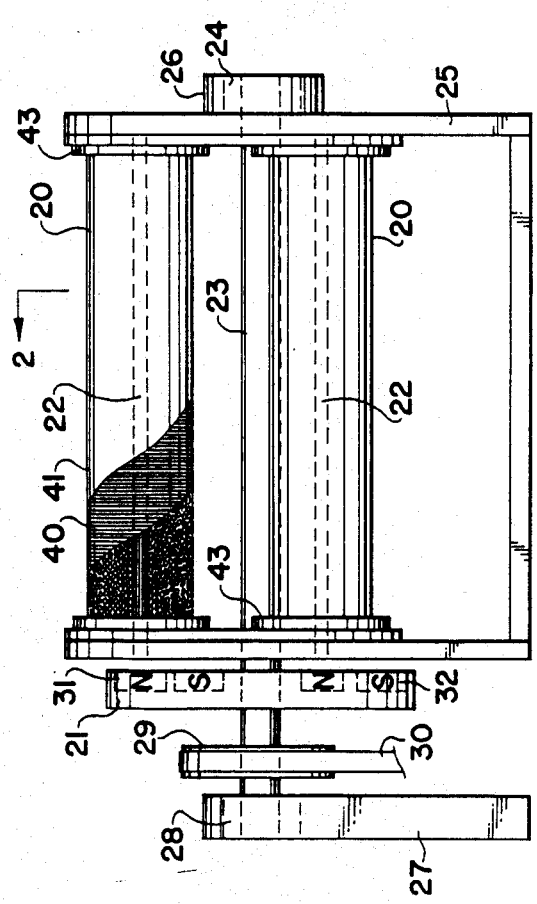
FIG. 1 is a front elevational view of one embodiment of the generator of this invention.

The features of this invention are best understood by reference to the attached drawings, particularly FIGS. 1–2 wherein the assembled invention is depicted.

The generator of this invention has three principal parts; namely, the induction coils 20, the armature 21, and the magnetic flux propagation cores 22. Coils 20 and core 22 are joined together in a single stationary structure, preferably in a suitable frame 43 which has the form of an empty spool. Armature 21 is rotatable about shaft 33 which is set in bearings 24 and 28 each end of shaft 23. At one end (right hand end in FIG. 1) the bearing 24 is mounted in a support plate 26 rigidly attached to a frame 25 which supports the entire generator. At the other end of shaft 23 (left hand in FIG. 1) bearing 28 is mounted in a shaft support 27. Armature 21 is rotated by a motor or other driving means (not shown) employing pulley 29 and belt 30 or any other suitable power transmission means.

Each coil 20 is a plurality of turns of electrically conductive wire, preferably copper insulated wire or the newly developed superconductor wire made of ceramic oxide compounds, such as those containing barium copper, lanthanum, yttrium, or the like. A single continuous length of wire is preferred with the two ends attached to terminals such as 34, 35, or 36 in FIG. 4. It is entirely operable to employ two or more separate lengths of wire with each length having its own terminals, but this arrangement is not as efficient as a single length of wire. An especially desirable arrangement is that shown in FIG. 1 wherein the wire is in layers 40 extending across the width of coil 20 with each layer 40 being separated from the next adjacent layer 40 by a film of dielectric material 41. Generally film layer 41 will be one continuous strip of material when wire layer 40 is formed of one continuous length of wire.

Core 22 lies along the longitudinal axis of coil 20. Core 22 is a magnetically conductive material, especially a laminated silicone steel strip or a bar or strip of a superconductor material as described above for the wire of coil 20. A preferred arrangement is for core 22 to be the central support around which layers of wire 40 and films of dielectric material 41 are wound to build up the final structure. Core 22 preferably extends the entire length of coil 20 and projects outwardly of coil 20 at one end (left end in FIG. 1) so as to permit the end of core 22 to be in close proximity to magnets 31 and 32 in armature 21.

Armature 21 comprises a rotatable shaft 23 supported by bearing 24 set in support plate 26 and a complimentary bearing 28 in shaft support 27 at the other end of shaft 23. Mounted rigidly on shaft 23 is a wheel or disc structure 21 supporting permanent magnets 31 and 32 each with its magnetic axis, i.e. north-to-south axis, parallel to the axis of shaft 23. Permanent magnets 31 and 32 are mounted rigidly on disc structure 21 near the outer periphery thereof, and in an alternating arrangement of polarities, i.e., every other magnet 31 has its north polarity facing outwardly while the magnets 32 in between have their south polarity facing outwardly. It is not desirable that adjacent magnets touch each other but it may be pereferable that they be close with only small gaps between adjacent magnets. The shape of magnet 31 is not a critical matter. The faces of magnets shown here are circular, but may be rectangular, triangular, etc. It is desirable, however, that the width of the outward face of each magnet 31 and 32 which faces the ends of cores 22 be substantially the same as the width of each core 22. This is because cores 22 conduct the magnetic flux received from magnets 31 and 32 to the induction coils 20 to cause the induction of electric current therein. The face of magnet 31 or 32 should be as close as possible to the end of core 22. The spacing and arrangement of coils 20 and cores 22 is such that at any instant in the rotation of armature 21 all of cores 22 are facing the same polarity of magnets 31 or 31; i.e., when one core 22 is facing magnet 31 with north polarity, all of the other cores 22 are also facing a magnet 31 of north polarity, and similarly, when a core 22 is facing a magnet 32 with south polarity, all other cores 22 are also facing a magnet 32 of south polarity. The generator of this invention has two or more cores 22. The number of magnets 31 and 32 on armature 21 will always be even and will be a multiple, 2, 3, 4, or more of the number of cores 22. If there are three cores 22, the number of magnets 31 and 32 may be six, twelve, eighteen, etc. If there are four cores 22, the number of magnets may be eight, sixteen, etc.

Figure 5:
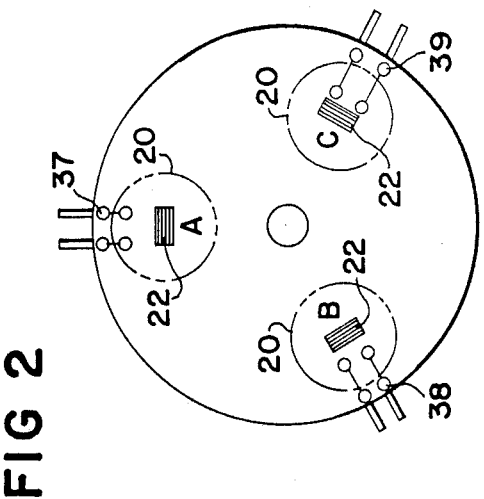
FIG. 5 is a schematic view showing the electrical connections of three separate coils producing three separate currents.
Figure 4:
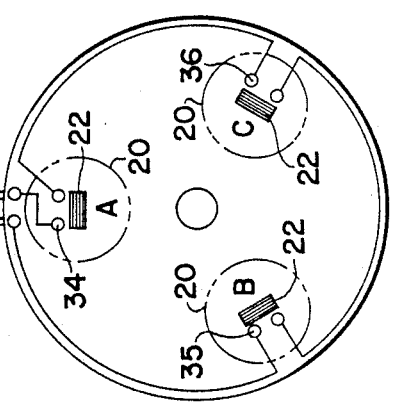
FIG. 4 is a schematic view showing the electrical connections of three separate coils joined in series.
Figure 3:
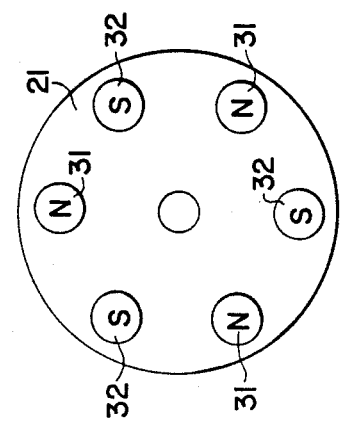
FIG. 3 is a front elevational view of the magnet disc of this invention.

In FIGS. 4-5 there are shown two ways in which to electrically connect the induced current from coils A, B, and C. In FIG. 4 terminals 34 of coil A are connected in series to terminals 35 of coil B, and, in turn, to terminals 36 of coil C. The entire output of all three coils A, B, and C is drawn off from terminals 33.

In FIG. 5 the same three coils A, B, and C are separately connected to terminals 37, 38, and 39, respectively, which is equivalent to a parallel connection.

Figure 7:
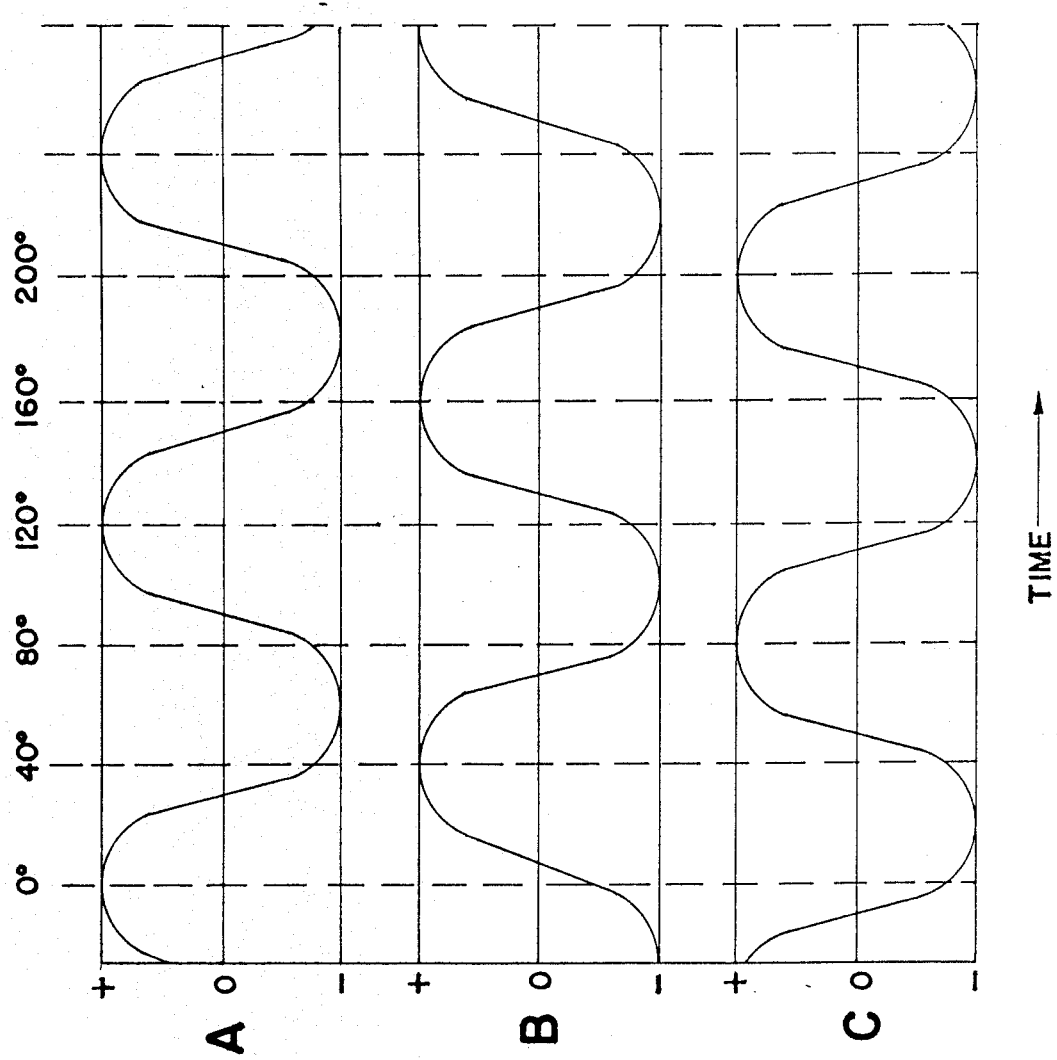
FIG. 7 is a schematic illustration of the three-phase current produced by a generator of this invention arranged as shown in FIG. 6.
Figure 6:
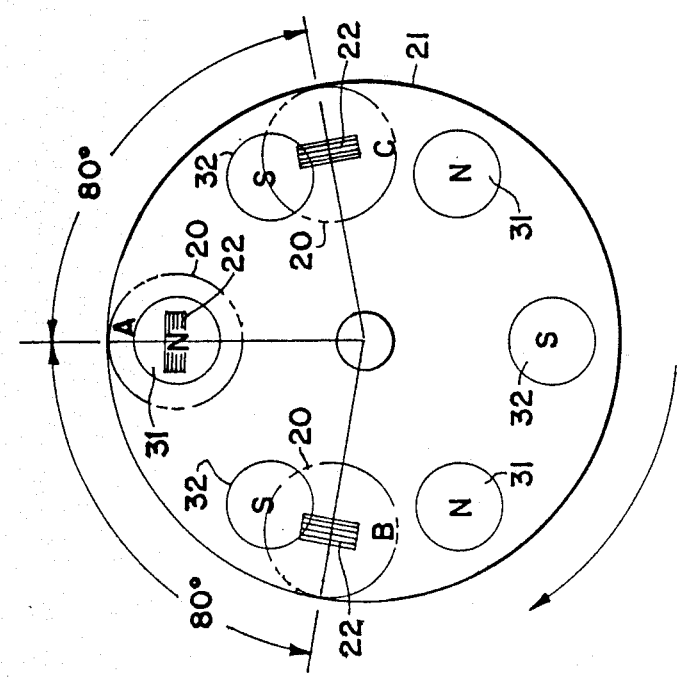
FIG. 6 is a schematic view showing the arrangment of three coils to produce three-phase current one-third of a cycle different from each other.
Figure 8:
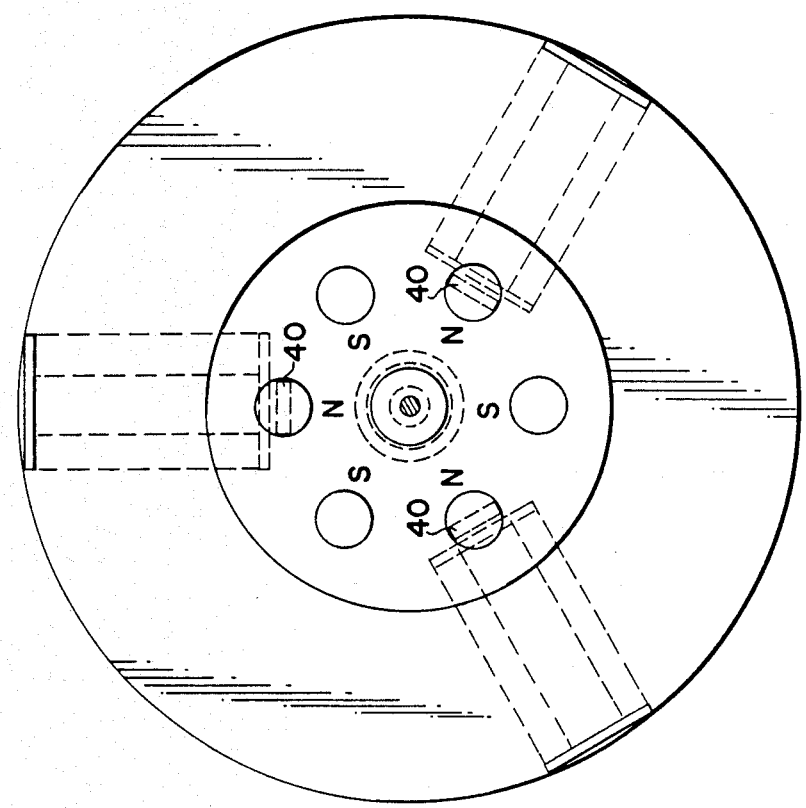
FIG. 8 is a front elevational view of a second embodiment of a generator of this invention.

In FIGS. 6-7 there is shown an arrangement for producing a three-phase alternating current from the generator of this invention. In this instance, the three coils A, B, and C are arranged to produce separate current, which lag behind each other one-third of a cycle. In FIG. 8 there are shown graphically the familiar sine wave representing alternating electric current. The graph for coil A shows a maximum positive value at 0°, a minimum negative value at 60° and a maximum positive value at 120°. A single cycle is, therefore, 120°. Exactly the same pattern is shown for coils B and C except that each is shifted one-third of a cycle (40°). Thus, coil B shows a maximum positive value at 40°, a minimum negative value at 100° and maximum positive value at 160°. Coil C shows a maximum positive value at 80°, a minimum negative value at 140° and a maximum positive value at 200°. These three graphs are 40° apart.

In order to produce the three-phase current shown in FIG. 7 coils A, B, and C must be arranged in different positions than the equal spaced positions shown in FIGS. 1-5. The positions shown for coils 20 (A, B, and C) with respect to magnets 31 and 32 on armature 21 represent the positions at 0° in FIG. 7. Coil A is at a maximum positive value, that is exactly in the center of magnet 31, a north polarity which represents a positive value. At that same moment coil B (FIG. 7) shows itself to be 10° before reaching a neutral value. On FIG. 6 a neutral value would be midway between magnets 31 and 32 which, would be 90° to the left of coil A. Therefore, coil B is at 80° left of coil A. Coil C in FIG. 7 at 0° is 20° before reaching a minimum negative value. In FIG. 7 a minimum negative value is when coil C is in the middle of magnet 32 of south polarity. Thus, the radius through magnet 32 on the right of coil A is 20° from the radius through coil C, or a total of 80° from coil A. If armature 21 rotates in the direction shown it will produce the three-phase current shown in FIG. 7.

Figure 9:
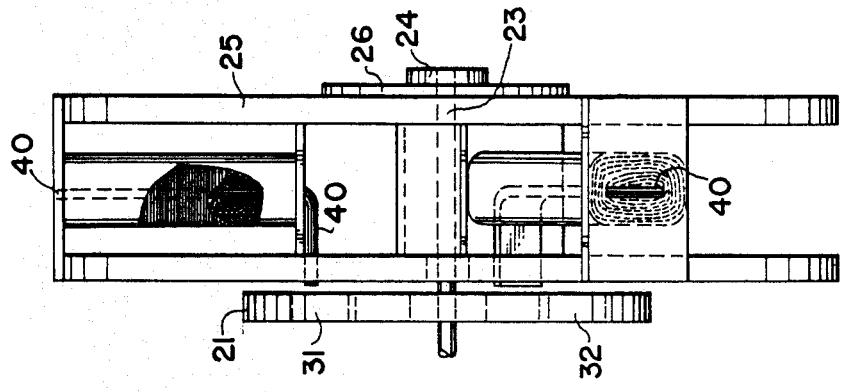
FIG. 9 is an end elevational view of the generator of FIG. 8.

In FIGS. 8 and 9 there are shown views of the general structure of the generator of copending application Ser. No. 152,327, cited above, but employing the multiple induction coils of this invention. Frame 25 is a large diameter, short length spool in which are mounted three coils 20 with an L-shaped core 40 in each coil. In this instance, coils 20 are oriented with their long axes radial; contrary to the arrangement of FIGS. 1-2 wherein the coils 20 are oriented with their long axes parallel to shaft 23. Core 40 is an L-shaped bar or strip with one leg encased in coil 20 and the other leg extending outwardly toward armature 21. The remainder of this generator is substantially the same as that of FIGS. 1-7 described above. Magnetic flux is conducted from magnets 31 and 32 as each passes the nearby end of core 40. The flux is conducted through core 40 to the interior of coil 20 causing the induction of alternating electric current therein. This arrangement provides the same energy output as that of FIGS. 1-2, assuming all coils 20 are equivalent, but it changes the size of the generator from a larger cyclinder of a large diameter.

It is to be understood that the materials of construction for coils 20 and cores 22 may be selected from a variety of compounds and compositions. Core 22 must be a good conductor of magnetic flux. Coil 20 must be a good conductor of electricity. Steel and laminated silicone steel are excellent for core 22. Copper and silver are excellent for coils 20. There is, however, a new material 20, known as a "superconductor" which is a ceramic oxide containing oxides of copper, barium lanthanum, yttrium, etc. These ceramic oxides are admirably suited for this invention.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An electric generator including a plurality of stationary induction coils, a rotatable armature, and an elongated magnetically conductive core in each said coil; said coil comprising a plurality of turns of electrically conductive wire in a tubular shape around and closely encasing said elongated magnetically conductive core extending lengthwise through the central axis of said coil; said armature comprising a rotatable shaft and a disc structure mounted on said shaft with an even number of permanent magnets mounted circuferentially thereof in an arragement of alternating polarity with the axis of each magnet being parallel to said shaft; said coils being positioned in a spaced circumferential arrangement with one end of each coil adjacent to said disc structure and said core extending outwardly of said end to be in close proximity to said magnets, said coils being spaced apart such that any instant all of said cores are adjacently facing said magnets of the same polarity.

2. The generator of claim 1 wherein the width of said core where it faces said magnets is substantially the same as the width of each said magnet.

3. The generator of claim 1 wherein said coils and said cores are elongated cylindrical structures having a central axis substantially parallel to said shaft.

4. The generator of claim 1 wherein said core is L-shaped with one leg of said L encased by said coil, and the other leg of said L extending to an end which is in said close proximity to said magnets.

5. The generator of claim 1 wherein said coils are electrically connected to each other in parallel.

6. The generator of claim 1 wherein said coils are electrically connected to each other in series.

7. The generator of claim 5 having at least 3 said coils which are positioned circumferentially such that the induced current from each coil is out of phase with the current from each other said coil.

8. The generator of claim 1 which additionally comprises said turns of wire in said coil being arranged in concentric layers, one wire in thickness with a layer of dielectric material separating adjacent layers of wire.

9. An electric generator including a plurality of induction coils, a magnetic flux conducting core in each said coil, and an armature; said coil comprising a continuous length of electrically conductive wire wrapped in a plurality of turns thereof in the shape of a generally cylindrical tube around said magnetic flux conducting core extending through the entire length of said core and extending outwardly of said coil at one end thereof; said armature comprising a rotatable shaft with a longitudinal axis and having mounted thereon a disc structure with a plurality of permanent magnets mounted thereon in circular arrangement adjacent the periphery of said disc structure in an arrangement whereby the axis of each said magnets is parallel to said axis of said shaft, with alternate magnets having opposite polarity facing outwardly, the circular arrangement of said magnets being spaced apart from but closely adjacent to said end of each said core extending outwardly from each said coil; the number and size of said magnets and the number and size of said cores being coordinated where they face each other such that the width of each said core is substantially equal to the width of each said magnet, and the number and spacing of said cores are such that at any instant said cores are all adjacently facing magnets having the same polarity facing said cores.

10. The generator of claim 9 wherein said strips in said cores and said coils are positioned with their longitudinal axes parallel to said axis of said shaft.

11. The generator of claim 9 wherein said cores strips are L-shaped with said coil encasing one leg of said L and the other leg of said L extending to a close proximity with said magnets.

12. The generator of claim 9 wherein each said coil is a plurality of concentric layers of a continuous length of wire separated from the next adjacent layer by a thin film of a dielectric material.

13. The generator of claim 12 wherein said wire is a superconducting material.

14. The generator of claim 9 wherein said coil is enclosed in a spool-shaped frame of electrically nonconductive and magnetically transparent material.

15. The generator of claim 9 wherein the said cores are made of superconducting material.

16. The generator of claim 9 wherein said cores are laminated silicone steel.

* * * * *